US009055274B2

(12) United States Patent
Casagrande

(10) Patent No.: US 9,055,274 B2
(45) Date of Patent: *Jun. 9, 2015

(54) ALTERING PRESENTATION OF RECEIVED CONTENT BASED ON USE OF CLOSED CAPTIONING ELEMENTS AS REFERENCE LOCATIONS

(71) Applicant: EchoStar Technologies, LLC, Englewood, CO (US)

(72) Inventor: Steven Michael Casagrande, Castle Pines, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,752

(22) Filed: Apr. 4, 2013

(65) Prior Publication Data
US 2013/0223814 A1 Aug. 29, 2013

Related U.S. Application Data

(63) Continuation of application No. 13/215,916, filed on Aug. 23, 2011, now Pat. No. 8,437,622.

(51) Int. Cl.
H04N 5/76 (2006.01)
H04N 5/92 (2006.01)
(Continued)

(52) U.S. Cl.
CPC ............... *H04N 9/87* (2013.01); *H04N 9/8205* (2013.01); *G11B 27/105* (2013.01); *G11B 27/28* (2013.01); *G11B 27/322* (2013.01)

(58) Field of Classification Search
USPC .................. 386/291, 292, 244, 245, 248, 298
See application file for complete search history.

(56) References Cited

U.S. PATENT DOCUMENTS 4,706,121 A 11/1987 Young
4,723,246 A 2/1988 Weldon, Jr.
(Continued)

FOREIGN PATENT DOCUMENTS

CN 101404780 A 4/2009
EP 0 903 743 A 3/1999
(Continued)

OTHER PUBLICATIONS

U.S. Appl. No. 13/294,005, filed Nov. 11, 2011 Final Office Action mailed Jan. 3, 2014, 29 pages.
(Continued)

Primary Examiner — Robert Chevalier
(74) Attorney, Agent, or Firm — Kilpatrick Townsend & Stockton LLP

(57) ABSTRACT

A content receiver receives an captioning element and positional information regarding segments of a content instance. The captioning element corresponds to a component of captioning data included in content that can be utilized with the positional information to locate where the segments stop and/or start. The content receiver analyzes the content based on the captioning element and the positional information and alters how the content will be presented. Such alteration may involve skipping and/or deleting segments, starting/stopping presentation of content other than at the beginning and/or end of the content, altering recording timers, and/or replacing segments with alternative segments. In some implementations, the content may be recorded as part of recording multiple content instances received via at least one broadcast from a content provider wherein the multiple content instances are all included in a same frequency band of the broadcast and are all encoded utilizing a same control word.

20 Claims, 5 Drawing Sheets

(51) Int. Cl.
   *H04N 9/87*    (2006.01)
   *H04N 9/82*    (2006.01)
   *G11B 27/10*   (2006.01)
   *G11B 27/28*   (2006.01)
   *G11B 27/32*   (2006.01)

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,642,153 A | 6/1997 | Chaney et al. |
| 5,684,969 A | 11/1997 | Ishida |
| 5,805,763 A | 9/1998 | Lawler et al. |
| 5,974,218 A | 10/1999 | Nagasaka et al. |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0188943 A1 | 12/2002 | Freeman et al. |
| 2003/0026423 A1 | 2/2003 | Unger et al. |
| 2003/0078930 A1 | 4/2003 | Surcouf et al. |
| 2003/0110514 A1 | 6/2003 | West et al. |
| 2003/0152360 A1 | 8/2003 | Mukai et al. |
| 2003/0156826 A1 | 8/2003 | Sonoda et al. |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2004/0001087 A1 | 1/2004 | Warmus et al. |
| 2004/0015992 A1 | 1/2004 | Hasegawa et al. |
| 2004/0015999 A1 | 1/2004 | Carlucci et al. |
| 2004/0103428 A1 | 5/2004 | Seok et al. |
| 2004/0128682 A1 | 7/2004 | Liga et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0147383 A1 | 7/2005 | Ihara |
| 2005/0229213 A1 | 10/2005 | Ellis et al. |
| 2005/0271365 A1 | 12/2005 | Hisatomi |
| 2005/0273819 A1 | 12/2005 | Knudson et al. |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0274208 A1 | 12/2006 | Pedlow, Jr. |
| 2007/0016546 A1 | 1/2007 | De Vorchik et al. |
| 2007/0039032 A1 | 2/2007 | Goldey et al. |
| 2007/0061378 A1 | 3/2007 | Lee et al. |
| 2007/0157253 A1 | 7/2007 | Ellis et al. |
| 2007/0165855 A1 | 7/2007 | Inui |
| 2007/0192586 A1 | 8/2007 | McNeely |
| 2007/0204288 A1 | 8/2007 | Candelore |
| 2007/0234395 A1 | 10/2007 | Dureau et al. |
| 2007/0258596 A1 | 11/2007 | Kahn et al. |
| 2008/0046929 A1 | 2/2008 | Cho et al. |
| 2008/0092164 A1 | 4/2008 | Agarwal et al. |
| 2008/0104534 A1 | 5/2008 | Park et al. |
| 2008/0137850 A1 | 6/2008 | Mamidwar |
| 2008/0141322 A1 | 6/2008 | Jang et al. |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0129749 A1* | 5/2009 | Oyamatsu et al. .............. 386/95 |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2010/0020794 A1 | 1/2010 | Cholas et al. |
| 2010/0037282 A1 | 2/2010 | Iwata et al. |
| 2010/0050225 A1 | 2/2010 | Bennett |
| 2010/0086277 A1 | 4/2010 | Craner |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |

(56) References Cited

U.S. PATENT DOCUMENTS

| | | |
|---|---|---|
| 2010/0158480 A1 | 6/2010 | Jung et al. |
| 2010/0169926 A1 | 7/2010 | Westberg et al. |
| 2010/0195827 A1 | 8/2010 | Lee et al. |
| 2010/0232604 A1 | 9/2010 | Eklund, II |
| 2010/0235862 A1 | 9/2010 | Adachi |
| 2010/0239228 A1 | 9/2010 | Sano |
| 2010/0247067 A1 | 9/2010 | Gratton |
| 2010/0265391 A1 | 10/2010 | Muramatsu et al. |
| 2010/0284537 A1 | 11/2010 | Inbar |
| 2010/0313222 A1 | 12/2010 | Lee et al. |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0131413 A1 | 6/2011 | Moon et al. |
| 2011/0138169 A1 | 6/2011 | Michel |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0239249 A1 | 9/2011 | Murison et al. |
| 2011/0255002 A1 | 10/2011 | Witheiler |
| 2011/0311045 A1 | 12/2011 | Candelore et al. |
| 2012/0278837 A1 | 11/2012 | Curtis et al. |
| 2012/0296745 A1 | 11/2012 | Harper et al. |
| 2012/0311534 A1 | 12/2012 | Fox et al. |
| 2012/0311634 A1 | 12/2012 | Van Duyn et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0341377 A1 | 11/2014 | Kummer et al. |
| 2014/0344858 A1 | 11/2014 | Minnick |
| 2014/0363139 A1 | 12/2014 | Kirby |

FOREIGN PATENT DOCUMENTS

| | | |
|---|---|---|
| EP | 0 973 333 A | 1/2000 |
| EP | 1 168 347 A | 1/2002 |
| EP | 1372339 A2 | 12/2003 |
| EP | 1742467 A2 | 1/2007 |
| EP | 2 018 059 A1 | 1/2009 |
| EP | 1 667 452 B1 | 11/2011 |
| EP | 2826197 A1 | 1/2015 |
| EP | 2826238 A1 | 1/2015 |
| IN | 9740/CHENP/2013 A | 9/2014 |
| JP | 2007116525 | 5/2007 |
| WO | 02/41625 A1 | 5/2002 |
| WO | 2004/057610 A1 | 7/2004 |
| WO | 2008/010689 A1 | 1/2008 |
| WO | 2008/060486 A2 | 5/2008 |
| WO | 2011/027236 A1 | 3/2011 |
| WO | 2013/028824 A3 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

U.S. Appl. No. 13/215,655, filed Aug. 23, 2011 Final Office Action mailed Dec. 18, 2013, 20 pages.
U.S. Appl. No. 13/302,852, filed Nov. 22, 2011, Final Rejection mailed Dec. 9, 2013, 23 pages.
U.S. Appl. No. 13/215,598, filed Aug. 23, 2011 Final Office Action mailed Nov. 21, 2013, 23 pages.
U.S. Appl. No. 13/286,157, filed Oct. 31, 2011 Non-Final Office Action mailed Jul. 25, 2013, 49 pages.
U.S. Appl. No. 13/149,852, filed May 31, 2011, Notice of Allowance mailed Jul. 11, 2013, 13 pages.
U.S. Appl. No. 13/449,852, filed May 31, 2011, Final Office Action mailed Mar. 26, 2013, 13 pages.
U.S. Appl. No. 13/286,157, filed Oct. 31, 2011, Notice of Allowance mailed Feb. 3, 2014, 81 pages.
U.S. Appl. No. 13/614,899, filed Sep. 13, 2012, Final Office Action mailed Mar. 17, 2014, 41 pages.
U.S. Appl. No. 13/215,598, filed Aug. 23, 2011, Non-Final Office Action mailed Feb. 6, 2014, 12 pages.
U.S. Appl. No. 13/829,350, filed Mar. 14, 2013, Non Final Office Action mailed Feb. 28, 2014, 29 pages.
U.S. Appl. No. 13/799,719, filed Mar. 13, 2013, Non Final Office Action mailed Oct. 25, 2013, 79 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report of PCT/KR2007/003521 mailed on Oct. 23, 2007, 22 pages.
International Search Report of PCT/IB2003/005737 mailed on Mar. 3, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014, 70 pages.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013, 7 pages.
International Preliminary Report on Patentability for PCT/US2012/052002 mailed on Apr. 17, 2014, 10 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.

(56) References Cited

OTHER PUBLICATIONS

International Preliminary Report on Patentability, PCT/US2012/051987, mailed on Mar. 6, 2014, 7 pages.
U.S. Appl. No. 13/288,002, filed Nov. 2, 2011, Final Office Action mailed Mar. 27, 2014, 20 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Notice of Allowance mailed Apr. 23, 2014, 141 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
Author Unknown, "Move Networks is Delivering the Next Generation of Television," Move Networks, 2010, obtained online at http://movenetworks.com/, 2 pages.
Jung, J., et al., "Design and Implementation of a Multi-Stream CableCARD with a High-Speed DVB-Common Descrambler," ACM Multimedia, 2006, 4 pages.
U.S. Appl. No. 13/149,852, filed May 31, 2011, Non-Final Office Action mailed Dec. 12, 2012, 9 pages.
U.S. Appl. No. 13/286,157, filed Oct. 31, 2011, Non-Final Office Action mailed Jan. 17, 2013, 20 pages.
U.S. Appl. No. 13/215,702, filed Aug. 23, 2011, Notice of Allowance mailed Feb. 11, 2013, 13 pages.
U.S. Appl. No. 13/302,852, filed Nov. 22, 2011, Non-Final Rejection mailed May 23, 2013, 19 pages.
U.S. Appl. No. 13/324,831, filed Dec. 13, 2011 Non-Final Office Action mailed Feb. 28, 2013, 23 pages.
U.S. Appl. No. 13/292,047, filed Nov. 8, 2011 Non-Final Office Action mailed Jan. 18, 2013, 17 pages.
U.S. Appl. No. 13/614,899, filed Sep. 13, 2012 Non-Final Office Action mailed Feb. 5, 2013, 17 pages.
U.S. Appl. No. 13/291,014, filed Nov. 7, 2011 Non-Final Office Action mailed Mar. 29, 2013, 21 pages.
U.S. Appl. No. 13/215,916, filed Aug. 23, 2011 Notice of Allowance mailed Jan. 4, 2013, 10 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 13/288,002, filed Nov. 2, 2011, Non-final Office Action mailed Sep. 26, 2013, 15 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Sep. 17, 2013, 17 pages.
U.S. Appl. No. 13/291,014, filed Nov. 7, 2011 Notice of Allowance mailed Aug. 7, 2013, 16 pages.
U.S. Appl. No. 13/215,598, filed Aug. 23, 2011 Non-Final Office Action mailed Jun. 20, 2013, 15 pages.
U.S. Appl. No. 13/215,655, filed Aug. 23, 2011 Non-Final Office Action mailed Sep. 6, 2013, 27 pages.
U.S. Appl. No. 13/294,005, filed Nov. 11, 2011 Non-Final Office Action mailed Aug. 14, 2013, 32 pages.
U.S. Appl. No. 13/592,976, filed Aug. 23, 2012 Notice of Allowance mailed Oct. 7, 2013, 18 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
Extended European Search Report for EP 12825080 mailed Sep. 11, 2014, 10 pages.
Extended European Search Report for EP 12825521 mailed Nov. 24, 2014, 7 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
The Office Action dated Nov. 6, 2014 for Mexican Patent Application No. MX/a/2013/014677 is not translated into English. This document is from prosecution of the corresponding foreign matter for which we do not have a translation, 2 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2015, 45 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013, Notice of Allowance mailed Nov. 26, 2014, 32 pages.
U.S. Appl. No. 13/797,173, filed Mar. 12, 2013, Notice of Allowance mailed Nov. 24, 2014, 37 pages.
U.S. Appl. No. 13/757,168, filed Feb. 1, 2013, Notice of Allowance mailed Oct. 14, 2014, 28 pages.

(56) References Cited

OTHER PUBLICATIONS

U.S. Appl. No. 13/294,005, filed Nov. 11, 2011, Notice of Allowance mailed Oct. 31, 2014, 24 pages.
U.S. Appl. No. 13/292,047, filed Nov. 8, 2011, Final Office Action mailed Jan. 13, 2015, 22 pages.
U.S. Appl. No. 13/215,598, filed Aug. 23, 2011, Non-Final Office Action mailed Nov. 25, 2014, 18 pages.
Extended European Search Report for EP 12825474 mailed Jan. 7, 2015, 6 pages.
Extended European Search Report for EP 12825430 mailed Jan. 26, 2015, 9 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.

* cited by examiner

ALTERING PRESENTATION OF RECEIVED CONTENT BASED ON USE OF CLOSED CAPTIONING ELEMENTS AS REFERENCE LOCATIONS

CROSS-REFERENCES TO RELATED APPLICATIONS

This Application is a Continuation and claims priority to co-pending U.S. patent application Ser. No. 13/215,916 filed Aug. 23, 2011 and titled "ALTERING PRESENTATION OF RECEIVED CONTENT BASED ON USE OF CLOSED CAPTIONING ELEMENTS AS REFERENCE LOCATIONS", by Steven Michael Casagrande, the entire disclosure of which is incorporated by reference for all purposes.

FIELD OF THE INVENTION

This disclosure relates generally to presentation of received content, and more specifically to altering how received content will be presented based on received positional information regarding segments (or portions) of the content relative to closed captioning elements.

SUMMARY

The present disclosure discloses systems and methods for altering presentation of received content based on relative position of closed captioning elements. A content receiver may receive one or more closed captioning elements along with positional information regarding one or more segments of an instance of content. The closed captioning element may correspond to a component of the closed captioning data included in the content that can be utilized with the positional information to locate where the segments (or portions of the content) stop and/or start relative to the component of the closed captioning data. The content receiver may analyze the instance of content based at least on the closed captioning element and the positional information. Based on this analysis, the content receiver may alter how the instance of content will be presented.

In some cases, such alteration may involve skipping and/or deleting one or more segments (portions of the content), such as one or more commercials and/or one or more segments that are designated with a content rating above a content rating threshold set for the content receiver. In other cases, alteration may involve starting presentation of content at a location other than the beginning of the recorded content and/or stopping presentation of content at a location other than the end of the recorded content. In still other cases, alteration may include altering recording timers if the closed captioning element and position information are received before recordation completes. In yet other cases, alteration may involve replacing one or more commercials with alternative commercials, such as commercials specifically targeted to the user of the content receiver.

In various implementations, the instance of content may be recorded as part of recording a plurality of instances of content received via at least one broadcast from one or more content providers. In such implementations, the plurality of instances of content may all be included in a same frequency band of the broadcast and may all encoded utilizing a same control word. However, in other implementations the instance of content may be recorded as part of recording a single audio/visual stream.

In one or more cases, the component of the closed captioning data included in the instance of content corresponding to the closed captioning element may be unique within the total closed captioning data included the instance of content. As such, if the content receiver locates the unique component of the closed captioning data, the content receiver may then utilize the positional information to determine the locations of the segments. However, in some cases, the component of the closed captioning data included in the instance of content corresponding to the closed captioning element may not be unique as it may occur multiple times during the total closed captioning data included in the instance of content. In such cases, the positional information may be selected based on relative temporal position of the segments with respect to the first occurrence of the component of the closed captioning data included in the instance of content corresponding to the closed captioning element. As such, if the content receiver locates the first occurrence of the component of the closed captioning data included in the instance of content corresponding to the closed captioning element, the content receiver may then utilize the positional information to determine the locations of the segments.

In still other cases where the component of the closed captioning data included in the instance of content corresponding to the closed captioning element may not be unique as it occurs multiple times during the total closed captioning data included in the instance of content, the closed captioning element may correspond to the first component of the closed captioning data and an additional component of the closed captioning data that is located within temporal proximity to the first component in the closed captioning data. Although the first component of the closed captioning data included in the instance of content corresponding to the closed captioning element may occur multiple times, there may be only one occurrence of the first component of the closed captioning data that is temporally located proximate to the additional component in the closed captioning data included in the instance of content. As such, if the content receiver locates the occurrence of the first component of the closed captioning data that occurs within the temporal proximity of the additional component of the closed captioning data in the closed captioning data included in the instance of content, the content receiver may then utilize the positional information to determine the locations of the segments.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
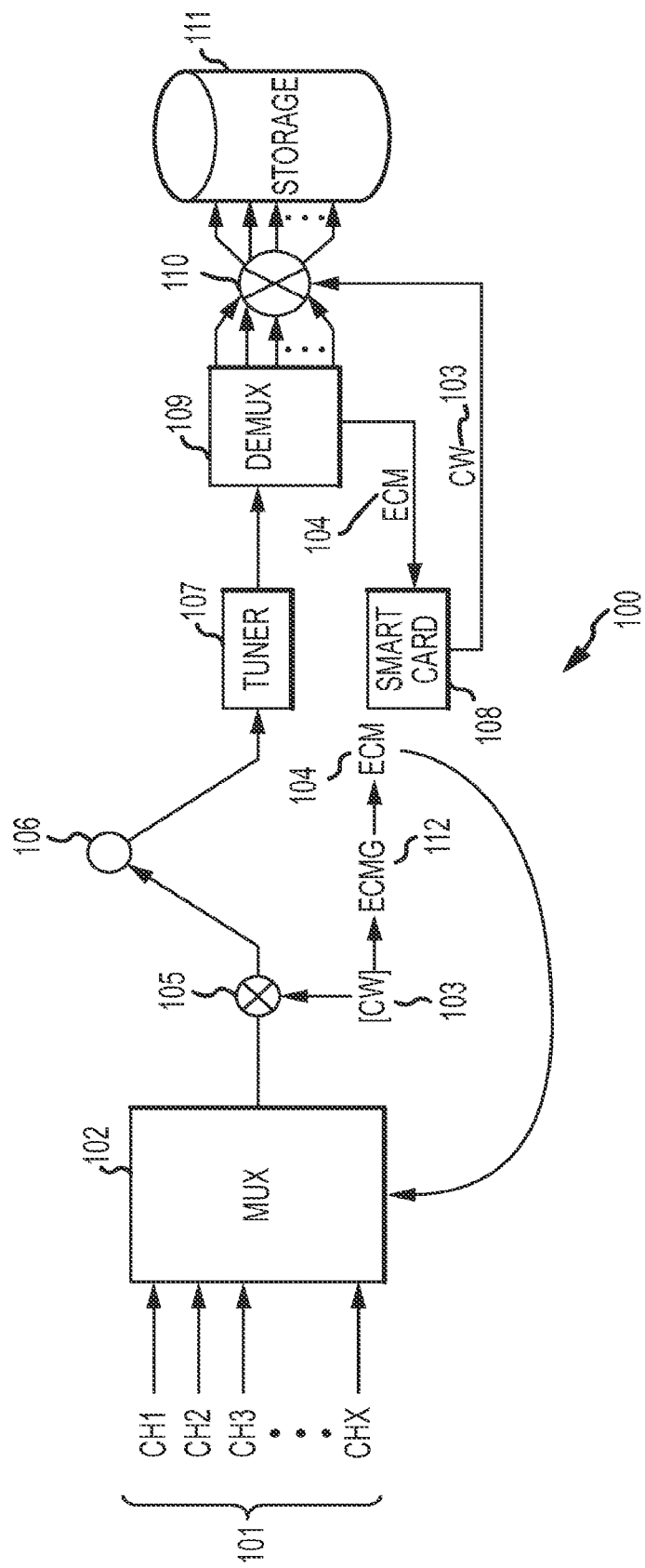
FIG. 1 is a block diagram illustrating a system for automatically recording multiple instances of content from one or more programming providers.

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, mobile computers, cellular telephones, smart phones, tablet computers, desktop computers, and so on) may receive content from one or more programming providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on). Such content receivers may transmit such received content to one or more presentation devices and/or store the received content for later presentation.

In some cases, content receivers may be configured utilizing one or more recording timers to automatically record content that is broadcast by one or more programming providers. Content receiver may be configured to automatically record broadcasted content by user input directly, in response to instructions received from content providers, and so on. Such configuration may involve a designation of the source from which to obtain the specified content as well as a time to begin recording and a time to stop recording.

However, the content that may be automatically recorded between the time to begin recording and the time to stop recording may not completely correspond to the content that a user may actually desire to access. For example, broadcast television programs may not start exactly at their designated start time, may finish after their designated end time, and/or may be delayed due to previous broadcast programs overrunning their time slots. In some cases, recording timers may be set to include recording buffers at the beginning and/or end of recording (such as starting two minutes before the television program is supposed to start and/or ending three minutes after the television program is supposed to finish broadcasting) in an attempt to ensure that the entire television program is recorded even if the television program does not start and/or end precisely on time. However, such a buffer (though possibly ensuring that the entire television program may be recorded) increases the amount of recorded content that may be presented which is not the television program.

Additionally, broadcast television programs may include one or more commercials and/or one or more objectionable scenes (such as extreme violence, nudity, adult language, and so on). As a result of such commercials, objectionable scenes, altered start and/or end times, delays, and/or recording buffers, a significant portion of the content that is recorded may be content other than the content which users wish to access. As a result, users may have to spend more time fast forwarding, rewinding, and/or performing other operations in order to access the desired content and may become frustrated, particularly when accessed content does not immediately present the desired content and/or when the entire desired content was not recorded at all.

The present disclosure discloses systems and methods for altering presentation of received content based on relative position of closed captioning elements. A content receiver may receive one or more closed captioning elements along with positional information regarding one or more segments (or portions) of an instance of content. The closed captioning element may correspond to a component of the closed captioning data included in the content that can be utilized with the positional information to locate where the segments stop and/or start relative to the component of the closed captioning data. For example, an closed captioning and positional information may specify that the start of a medical drama show included in an instance of content begins exactly five minutes prior to the occurrence of the phrase "spinal meningitis" in the closed captioning data included in the content.

Based at least on the closed captioning element and the positional information, the content receiver may analyze the instance of content and may alter how the instance of content will be presented. Such alteration may involve skipping and/or deleting one or more segments, starting presentation of content at a location other than the beginning of the recorded content, altering recording timers if the closed captioning and position information are received before recordation completes, replacing one or more commercials with alternative commercials, and so on. As a result of the content receiver altering how the content will be presented, the content presented to users when accessed may more closely correspond to the content the users desire to access and the users may be more satisfied with their content accessing experiences.

In some cases, users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the programs may include multiple PIDs (packet identifiers), such as a video PID and one or more audio PIDs for a particular instance of content. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels, such as by utilizing a PID filter to keep data identified by PIDs related to the particular programming channel and discard data identified by PIDs not related to that particular programming channel. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM by an ECM generator 112 which may take the CW as an input (and may also include other information such as access criteria) and outputs the ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency (which may be filtered by a PID filter, not shown) may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the CW prior to multiplexing. In another example, in some implementations, the data received via the tuned frequency may be demultiplexed before being individually descrambled utilizing the CW.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file).

Figure 2:
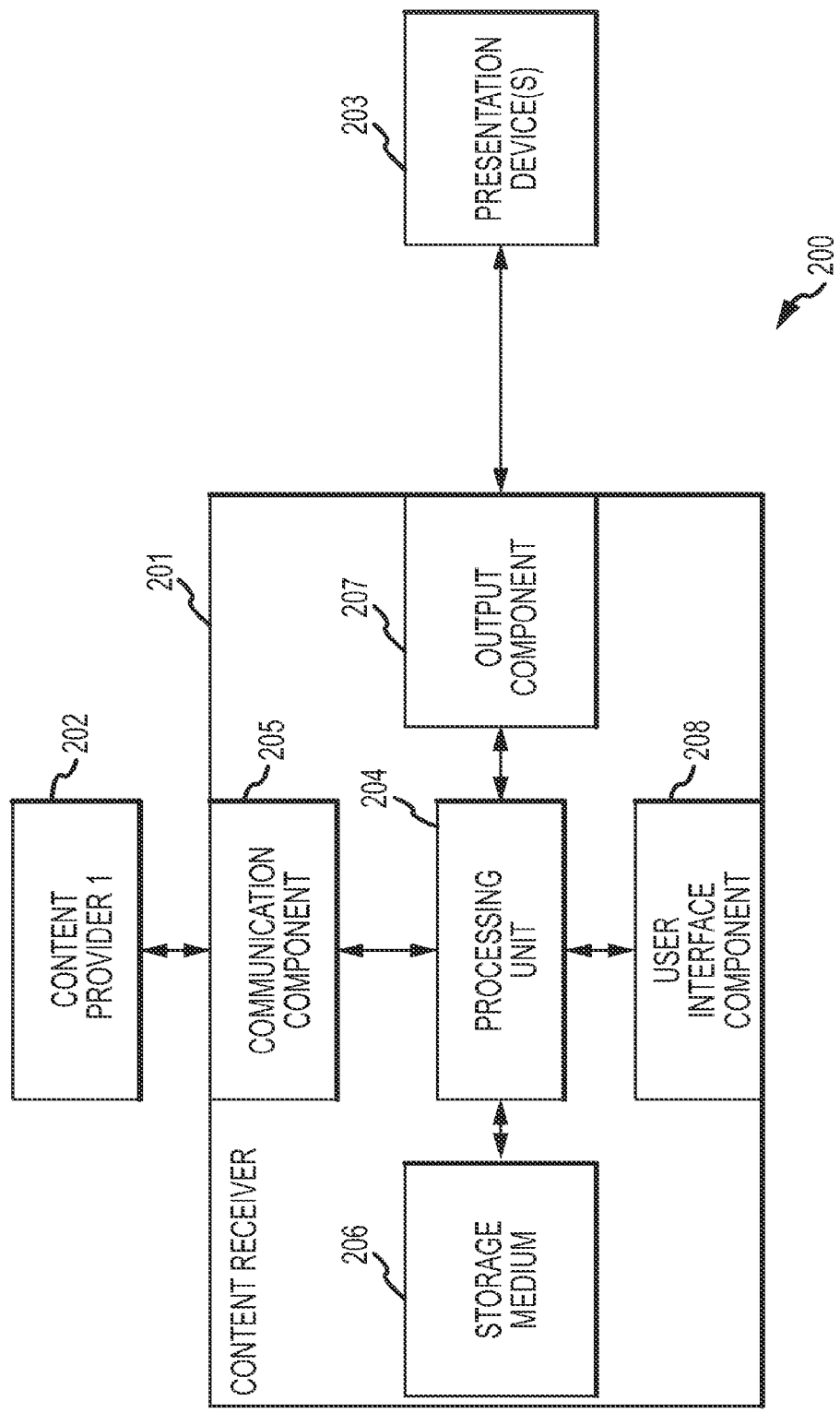
FIG. 2 is a block diagram illustrating a system for altering presentation of received content based on relative position of closed captioning elements. This system may be interrelated with the system of FIG. 1.

FIG. 2 is a block diagram illustrating a system 200 for altering presentation of received content based on relative position of closed captioning elements. The system 200 includes a content receiver 201 that receives content from one or more content providers 202. The content receiver may be any kind of content receiver such as a set top box, a television receiver, a digital video recorder, a mobile computer, a cellular telephone, a smart phone, a tablet computer, a desktop computer, and/or any other kind of electronic device that is capable of receiving content from the content provider. The content provider may be any kind of content provider such as a satellite television programming provider, a cable television programming provider, an Internet service provider, a video on demand provider, a pay-per-view movie provider, a digital music provider, and/or any other kind of entity capable of transmitting content to the content receiver.

The content receiver 201 may include one or more processing units 204, one or more communication components 205, one or more non-transitory storage media 206 (which may take the form of, but is not limited to, a magnetic storage medium; optical storage medium; magneto-optical storage medium; read only memory; random access memory; erasable programmable memory; flash memory; and so on), one or more output components 207, and one or more user interface components 208. The processing unit may execute instructions stored in the non-transitory storage medium to receive content from the content provider 202 via the communication component, store content received from the content provider in the non-transitory storage medium, and/or present content received from the content provider and/or stored in the non-transitory storage medium to one or more presentation devices 203 via the output component. The processing unit may execute such instructions and/or perform various other operations at the direction of instructions received from a user via the user interface component and/or instructions received from the content provider via the communication component.

The processing unit 204 may also receive one or more closed captioning elements corresponding to one or more instances of content from the content provider 202. Along with the closed captioning element, the processing unit may also receive positional information from the content provider regarding one or more segments (or portions) of the instance of content relative to the closed captioning element. In various cases, such closed captioning elements and/or positional information may be received prior to receipt of the instance of content, while the instance of content is being receiver, and/or subsequent to receipt of the instance of content. The positional information may identify the start and/or stop locations of the segments in the instance of content relative to one or more components of closed captioning data included in the instance of content corresponding to the closed captioning element. In some cases, the processing unit may receive one or more redundant copies of the closed captioning element and/or the positional information in case that the first received closed captioning element and/or positional information are corrupt, dropped, and/or are otherwise unusable.

For example, an closed captioning element may correspond to the phrase "I want to order chicken waffles" in closed captioning data included in an instance of content and the positional information may identify that a commercial segment begins in the instance of content five minutes after the occurrence of the phrase "I want to order chicken waffles" and ends ten minutes after the occurrence of the phrase "I want to order chicken waffles." As such, regardless of how the duration of the instance of content may be changed by buffers during recordation, the precise position of the commercial segment can be identified relative to the located phrase "I want to order chicken waffles."

The closed captioning element and/or the positional information may be created by the content provider 202. The content provider may create the closed captioning element and/or the positional information by analyzing a content feed that is subsequently broadcast, substantially simultaneously being broadcast, and/or was previously broadcast. In various implementations, the content feed may be analyzed by content provider staff utilizing video and/or audio editing software to select one or more components of closed captioning data included in the instance of content to correspond to the closed captioning element, determine positional information for one or more segments relative to the selected component of the closed captioning data, create and/or transmit the closed captioning element and/or positional information, and so on. In other implementations, these activities may be performed by automated video and/or audio editing software.

In some implementations, the instance of content may be recorded by the processing unit 204 as part of recording a plurality of instances of content received via at least one broadcast from the content provider 202 as described above with respect to FIG. 1. Further, as discussed above with respect to FIG. 1, the plurality of instances of content may all be included in a same frequency band of the broadcast and may all be encoded utilizing a same control word.

In response to receiving such closed captioning elements and positional information, the content receiver 201 may analyze the instance of content. The closed captioning element may be compared against the closed captioning data included in the instance of content. In analyzing the instance of content, the content receiver may identify the location of the component of the closed captioning data corresponding to the closed captioning element and may additionally identify the locations of the segments relative to the component of the closed captioning data. Based on the analysis, the content receiver 201 may alter how the instance of content will be presented via the output component 207. Exactly how the content receiver alters the instance of content may be based on user input received via the user interface component 208, instructions received from the content provider 202, and/or one or more configuration settings and/or defaults stored in the non-transitory storage medium.

By way of a first example, the content receiver 201 may alter how the instance of content will be presented by configuring the instance of content such that a particular segment is not presented, or skipped, when the instance of content is presented. Such a segment may be a portion of the instance of content preceding the start of an event included in the instance of content, a portion of the instance of content subsequent to the end of an event included in the instance of content, one or more commercials, a portion of the instance of content that includes a content rating (such as a content rating indicating the presence of nudity, graphic violence, adult language, and so on) exceeding a content rating setting of the content receiver, and so on. Thus, although the skipped segment is still present in the instance of content, the skipped segment will not be presented to a user when the instance of content is presented and the user may be unaware that the skipped segment is still present in the instance of content.

In a second example, the content receiver 201 may alter how the instance of content will be presented by removing a particular segment from the instance of content. As such, when the instance of content is presented, the removed segment is not presented because the removed segment is no longer part of the instance of content. Such a segment may be a portion of the instance of content preceding the start of an event included in the instance of content, a portion of the instance of content subsequent to the end of an event included in the instance of content, one or more commercials, a portion of the instance of content that includes a content rating (such as a content rating indicating the presence of nudity, graphic violence, adult language, and so on) exceeding a content rating setting of the content receiver, and so on. Thus, when the content is presented, the content does not include the removed segment and the removed segment is not presented to the user.

In cases where the content receiver 201 alters how the instance of content will be presented by removing one or more segments, the content receiver may replace the one or more removed segments with alternative segments and/or otherwise insert the alternative segments. For example, the content receiver may replace the commercials included in the instance of content with an alternative commercial that is targeted to the user and cannot be fast forwarded or otherwise skipped when the instance of content is presented.

In a third example, the content receiver 201 may receive the closed captioning element and positional information prior to completing recordation of the instance of content. Further, based on the analysis of the instance of content, the closed captioning element, and/or the positional information, the content receiver may determine that an event included in the instance of content will complete after the original recording stop time. For example, a previously broadcast instance of content may have overrun a time slot allocated to the previously broadcast instance of content and the air time for the event may have been pushed back beyond any buffer set for recording the instance of content. Based on this determination, the content receiver may extend the original recording stop time so that the entirety of the event is included in the instance of content despite the delayed air time.

Figure 3:
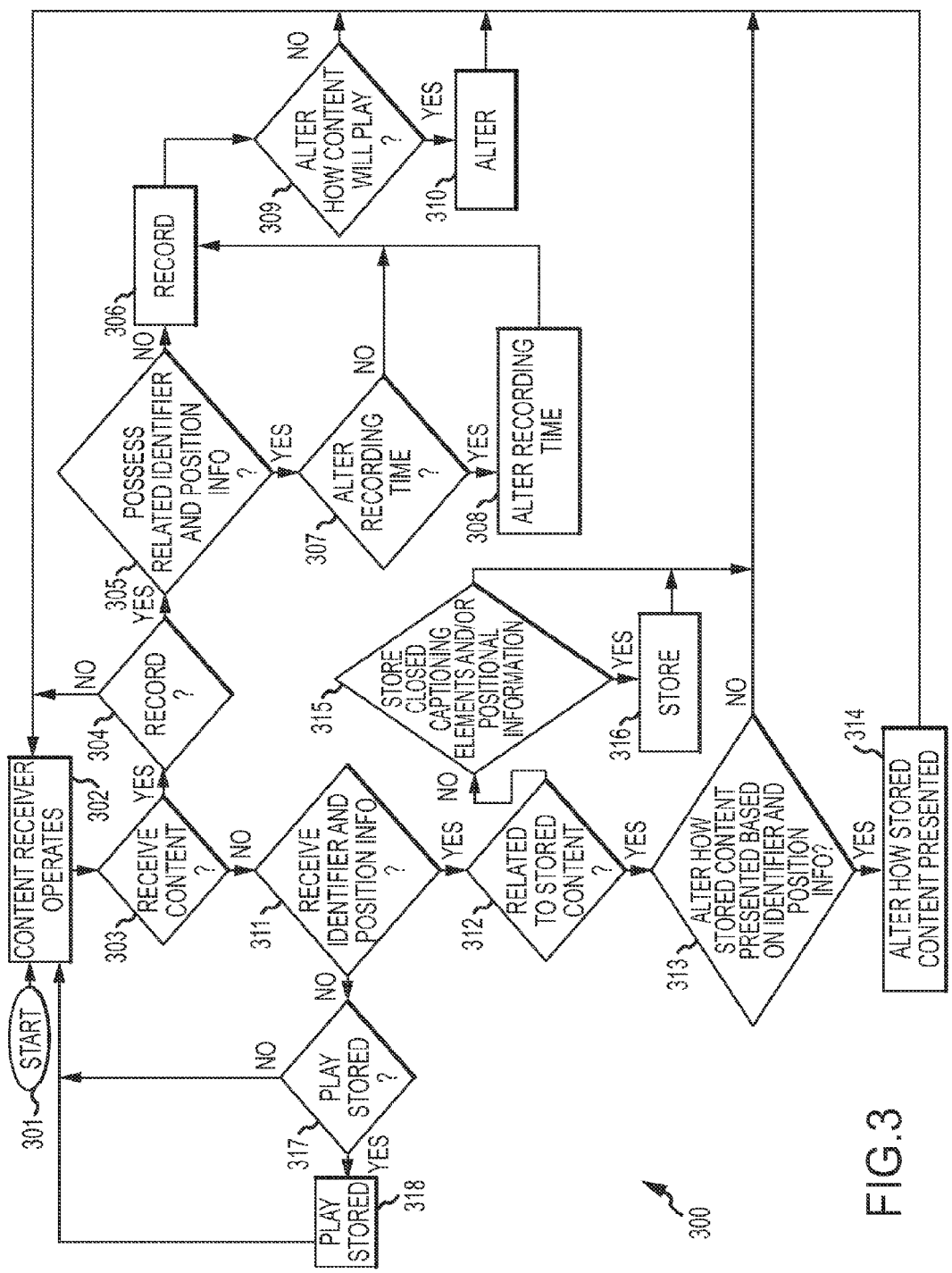
FIG. 3 is a flow chart illustrating a method for altering presentation of received content based on relative position of closed captioning elements. This method may be performed by the system of FIG. 1.

FIG. 3 illustrates a method 300 for altering presentation of received content based on relative position of closed captioning elements. The method 300 may be performed by the content receiver 201 of FIG. 2. The flow begins at block 301 and proceeds to block 302 where the content receiver operates. The flow then proceeds to block 303 where the processing unit 204 determines whether or not content is being received. If so, the flow proceeds to block 304. Otherwise, the flow continues to block 311.

At block 304, after the processing unit 204 determines that content is being received, the processing unit determines whether or not to store the content being received. In some implementations, the processing unit may determine whether or not to store the content being received based on one or more recording timers stored in the non-transitory storage medium 206. If not, the flow returns to block 302 and the content receiver 201 continues to operate. Otherwise, the flow proceeds to block 305.

At block 305, after the processing unit 204 determines to store the content being received, the processing unit determines whether or not closed captioning elements and positional information related to the content being received are stored in the non-transitory storage medium 206. If not, the flow proceeds to block 306 where the processing unit records the content being received in the non-transitory storage medium before the flow proceeds to block 309. Otherwise, the flow proceeds to block 307.

At block 307, after the processing unit 204 determines that closed captioning elements and positional information related to the content being received are stored in the non-transitory storage medium 206, the processing unit determines whether or not analysis of the content being received, the closed captioning elements, and the positional information indicates that a recording time associated with the content being received should be altered. If not, the flow proceeds to block 306 where the processing unit records the content being received in the non-transitory storage medium 206 before the flow proceeds to block 309. Otherwise, the flow proceeds to block 308 where the processing unit alters the recording time accordingly before the flow proceeds to block 306.

At block 309, the processing unit 204 determines whether or not analysis of the content being received, the closed captioning elements, and the positional information indicates that how the recorded content will be presented should be altered. If not, the flow returns to block 302 and the content receiver 201 continues to operate. Otherwise, the flow proceeds to block 310 where the processing unit alters how the recorded content will be presented, such as by altering one or more indexes that may be utilized to present the recorded content. Then, the flow returns to block 302 and the content receiver 201 continues to operate.

At block 311, after the processing unit 204 determines that content is not being received, the processing unit determines whether one or more closed captioning elements and/or positional information has been received. If not, the flow proceeds to block 317. Otherwise, the flow proceeds to block 312.

At block 312, after the processing unit 204 determines that one or more closed captioning elements and/or positional information have been received, the processing unit determines whether or not the received closed captioning elements and/or positional information are related to content stored in the non-transitory storage medium 206. If so, the flow proceeds to block 315. Otherwise, the flow proceeds to block 313.

At block 313, after the processing unit determines that the received closed captioning elements and/or positional information are related to content stored in the non-transitory storage medium 206, the processing unit determines whether or not analysis of the related stored content, the closed captioning elements, and the positional information indicates that how the stored content will be presented should be altered. If not, the flow returns to block 302 and the content receiver 201 continues to operate. Otherwise, the flow proceeds to block 314 where the processing unit alters how the stored content will be presented (such as by altering one or more indexes that may be utilized to present the stored content) before the flow returns to block 302 and the content receiver 201 continues to operate.

At block 315, after the processing unit determines that the received closed captioning elements and/or positional information are not related to content stored in the non-transitory storage medium 206, the processing unit determines whether or not to store the closed captioning elements and/or positional information. If not, the flow returns to block 302 and the content receiver 201 continues to operate. Otherwise, the flow proceeds to block 316 where the processing unit stores the closed captioning elements and/or positional information in the non-transitory storage medium 206 before the flow returns to block 302 and the content receiver 201 continues to operate.

Returning to FIG. 2, in some implementations, the component of the closed captioning data included in the instance of content corresponding to the closed captioning element may be unique within the total closed captioning data included in the instance of content. For example, if the component of the closed captioning data included in the instance of content corresponding to the closed captioning element constitutes the phrase "Frank said he's driving to Tulsa," the phrase may be unique if the phrase only occurs once during the total the closed captioning data included in the instance of content. As such, if the content receiver 201 locates the phrase "Frank said he's driving to Tulsa" anywhere in the closed captioning data included in the instance of content, the content receiver may then utilize the positional information to determine the locations of the segments.

However, in various other implementations, the phrase "Frank said he's driving to Tulsa" may not be unique as it may occur multiple times during the total closed captioning data included in the instance of content. In such cases, the positional information may be selected based on relative temporal position of the segments with respect to the first occurrence of the phrase "Frank said he's driving to Tulsa" in the closed captioning data included in the instance of content. As such, if the content receiver 201 locates the first occurrence of the phrase "Frank said he's driving to Tulsa" in the closed captioning data included in the instance of content, the content receiver may then utilize the positional information to determine the locations of the segments.

In still other implementations where the phrase "Frank said he's driving to Tulsa" may not be unique as it occurs multiple times during the total closed captioning data included in the instance of content, the closed captioning element may correspond to the first component of the closed captioning data and an additional component of the closed captioning data that is located within temporal proximity to the phrase "Frank said he's driving to Tulsa." Although the phrase "Frank said he's driving to Tulsa" may occur multiple times, there may be only one occurrence of the phrase "Frank said he's driving to Tulsa" that is temporally located exactly thirty second after the occurrence of the phrase "Bob asked what Frank plans to do about losing the farm" in the closed captioning data included in the instance of content. As such, if the content receiver 201 locates the occurrence of the phrase "Frank said he's driving to Tulsa" that occurs exactly thirty seconds after the occurrence of the phrase "Bob asked what Frank plans to do about losing the farm" in the closed captioning data included in the instance of content, the content receiver may then utilize the positional information to determine the locations of the segments.

Figure 4A:
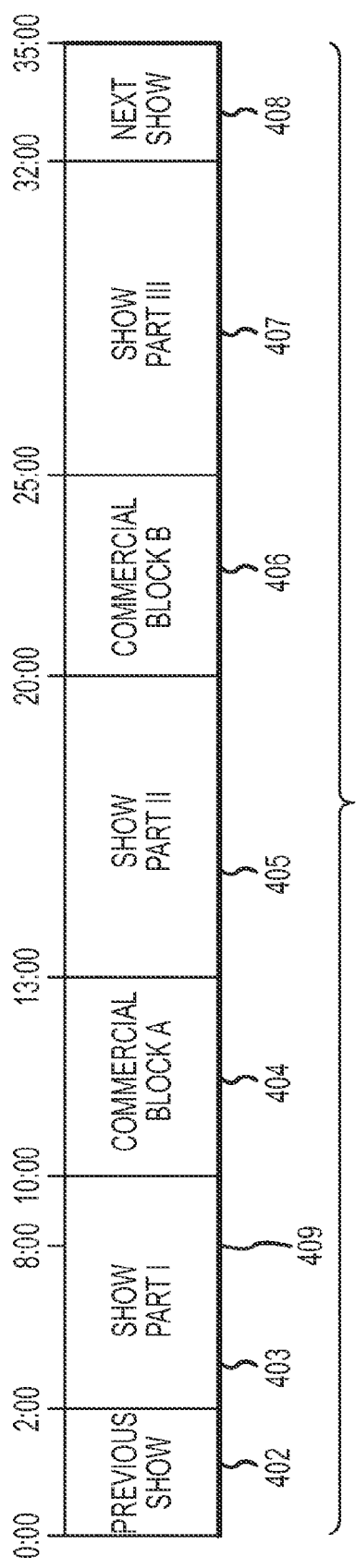
FIGS. 4A-4D are diagrams illustrating alteration of presentation of received content by a system based on relative position of closed captioning elements. The system may be the system of FIG. 2.

FIGS. 4A-4D illustrate alteration of presentation of received content 401a-401d by a system based on relative position of closed captioning elements. The system may be the system of FIG. 2. FIG. 4A is a conceptual diagram of an instance of received content 401a. As shown, the instance of received content includes part I of a show 403, part II of the show 405, and part III of the show 407. As also shown, in addition to the parts of the show, the instance of received content also includes a portion of a previous show 402, a commercial block A 404, a commercial block B 406, and a portion of a next show 408. As further illustrated, the instance of received content further includes a component 409 of closed captioning data included in the received content that corresponds to a closed captioning element.

A content receiver that has received the instance of content 401a may also receive the closed captioning element as well as positional information that specifies the start and stop of each of the segments included in the instance of content. The content receiver may then analyze the closed captioning data included in the instance of content based on the closed captioning element and the positional information and may thereupon alter how the instance of content will be presented.

In some cases, the content receiver may configure the instance of content 401a such that one or more of the segments are skipped when the instance of content is presented. For example, the content receiver may configure the instance of content such that playing the instance of content starts at 2:00 and finishes at 32:00. Thus, the portion of the previous show 402 and the portion of the next show 408 would not be presented when the instance of content is played even though both are still present. By way of another example, the content receiver may configure the instance of content such that playing the instance of content starts at 2:00, jumps from 10:00 to 13:00, jumps from 20:00 to 25:00, and finishes at 32:00. Thus, the portion of the previous show 402, the commercial block A 404, the commercial block B 406, and the portion of the next show 408 would not be presented when the instance of content is played even though all are still present.

Figure 4B:
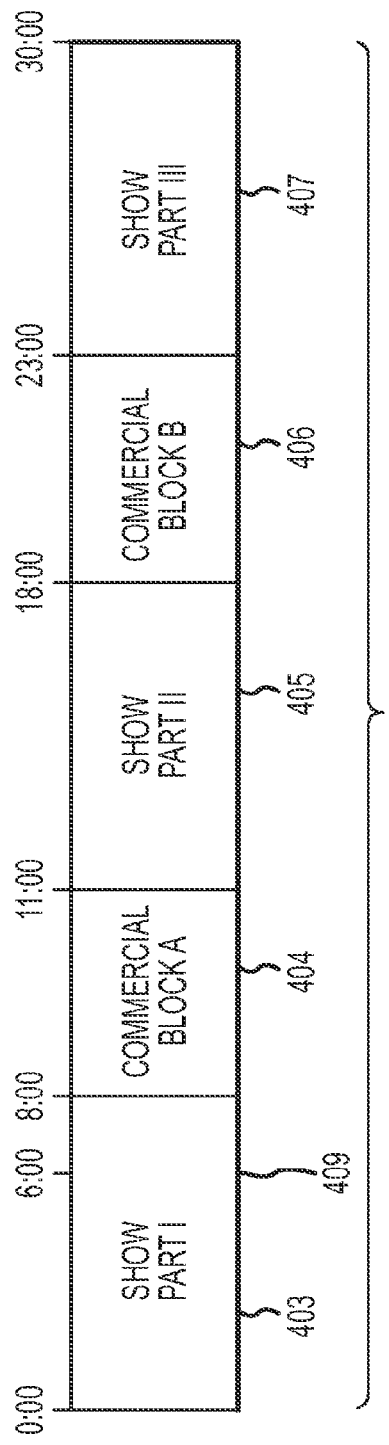

In other cases, the content receiver may remove one or more segments from the instance of content 401a such that removed segments are not included in the instance of content and are hence not played when the instance of content is presented. For example, as illustrated by FIG. 4B, the content receiver may remove the portion of the previous show 402 and the portion of the next show 408 from the instance of content 401b. As the portion of the previous show 402 and the portion of the next show 408 are no longer a component of the instance of content 401b, the portion of the previous show 402 and the portion of the next show 408 will not be played when the instance of content 401b is presented.

Figure 4C:
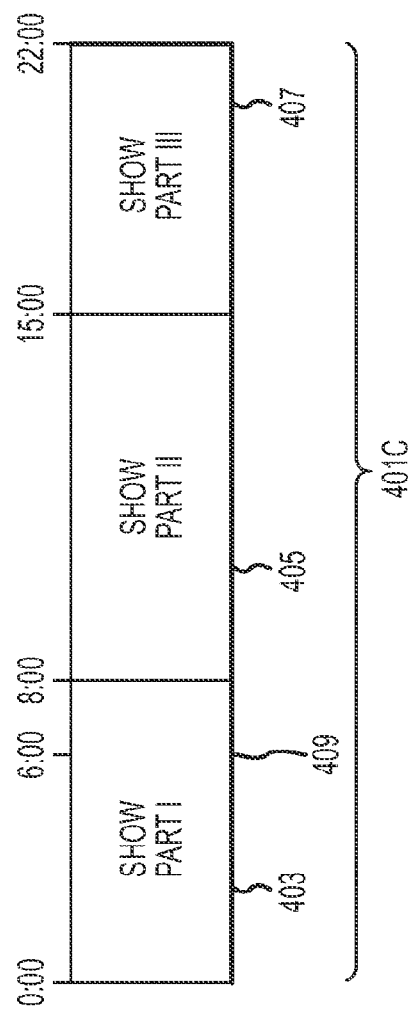

By way of a second example, as illustrated by FIG. 4C, the content receiver may remove the portion of the previous show 402, the commercial block A 404, the commercial block B 406, and the portion of the next show 408 from the instance of content 401c. As the portion of the previous show 402, the commercial block A 404, the commercial block B 406, and the portion of the next show 408 are no longer a component of the instance of content 401c, none of these segments will be played when the instance of content 401c is presented.

Figure 4D:
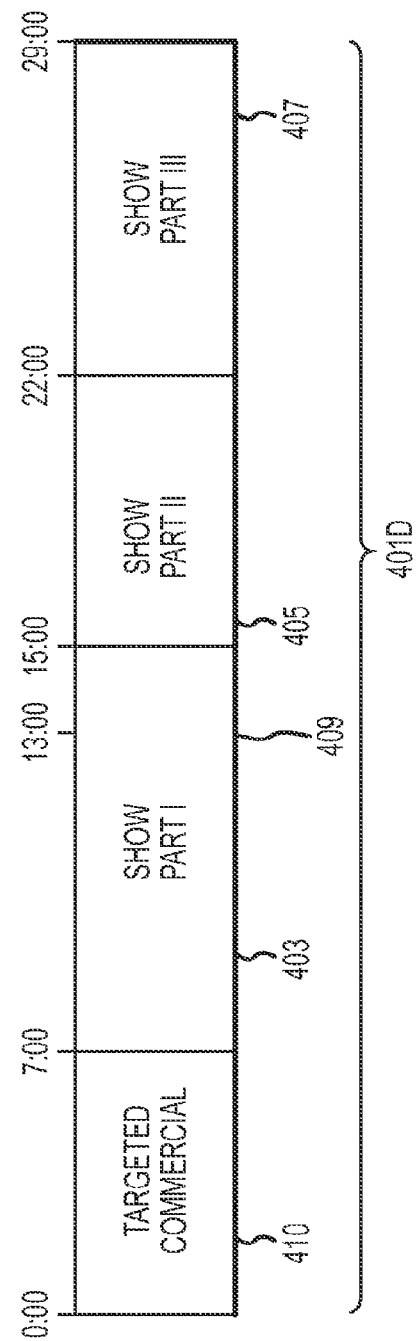

In still other cases, as illustrated by FIG. 4D, the content receiver may insert one or more alternative segments into the instance of content 401d as well as remove one or more segments from the instance of content 401d such that removed segments are not included in the instance of content and are hence not played when the instance of content is presented. As illustrated, the portion of the previous show 402, the commercial block A 404, the commercial block B 406, and the portion of the next show 408 are no longer a component of the instance of content 401d and will not be played when the instance of content 401d is presented. Further, as illustrated, a commercial 410 targeted to the user of the set top box has been inserted into the instance of content 401d and will be played prior to part I of the show 403 when the instance of content 401d is played.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A television receiver, comprising:
   a tuner;
   one or more processors; and
   a non-transitory computer-readable storage media communicatively readable by the one or more processors and having stored therein processor-readable instructions which, when executed by the one or more processors, cause the one or more processors to:

record multiple instances of content via the tuner from a content provider, wherein
the multiple instances of content are multiplexed, broadcast during a same period of time, and are selected for recording by the content provider;
receive closed captioning elements via the tuner, wherein the closed captioning elements correspond to an instance of content of the recorded multiple instances of content;
receive positional information indicative of a segment of the instance of content for playback based on the closed captioning elements;
analyze the instance of content to identify the segment of the instance of content based on the closed captioning elements and the positional information; and
alter presentation of the instance of content based on the identified segment of the instance of content such that less than all of the instance of content is presented.

2. The television receiver of claim 1, wherein the processor-readable instructions which, when executed by the one or more processors, cause the one or more processors to analyze the instance of content to identify the segment of the instance of content based on the closed captioning elements and the positional information comprises processor-readable instructions which, when executed by the one or more processors, cause the one or more processors to:
locate a phrase within the closed captioning elements, wherein the phrase is indicated in the positional information; and
based on the located phrase within the closed captioning elements, identify the segment of instance of content.

3. The television receiver of claim 1, wherein the identified segment of the instance of content corresponds to commercials.

4. The television receiver of claim 1, wherein the identified segment of the instance of content corresponds to a content rating different than a content rating of another portion of the instance of content.

5. The television receiver of claim 1, wherein the processor-readable instructions which, when executed by the one or more processors, further cause the one or more processors to:
store the instance of content received via the tuner from the content provider based on a recording timer stored by the non-transitory computer-readable storage medium.

6. The television receiver of claim 1, wherein the processor-readable instructions which, when executed by the one or more processors, cause the one or more processors to alter presentation of the instance of content based on the identified segment, comprises processor-readable instructions which, when executed by the one or more processors, cause the one or more processors to:
output the instance of content for presentation, wherein the presentation is altered based on the identified segment.

7. The television receiver of claim 6, wherein the processor-readable instructions which, when executed by the one or more processors, cause the one or more processors to alter presentation of the instance of content based on the identified segment, comprises processor-readable instructions which, when executed by the one or more processors, cause the one or more processors to skip output of a portion of the instance of content based on the identified segment.

8. The television receiver of claim 7, wherein the portion of the instance of content is the identified segment.

9. The television receiver of claim 1, wherein the processor-readable instructions which, when executed by the one or more processors, cause the one or more processors to alter presentation of the instance of content based on the identified segment, comprises processor-readable instructions which, when executed by the one or more processors, cause the one or more processors to delete a portion of the instance of content based on the identified segment.

10. A method for altering presentation of content, the method comprising:
recording, by a television receiver, multiple instances of content from a content provider, wherein
the multiple instances of content are multiplexed and are selected for recording by the content provider;
receiving, by the television receiver, closed captioning elements via the tuner, wherein the closed captioning elements correspond to an instance of content of the recorded multiple instances of content;
receiving, by the television receiver, positional information indicative of a segment of the instance of content for playback based on the closed captioning elements;
analyzing, by the television receiver, the instance of content to identify the segment of the content based on the closed captioning elements and the positional information; and
altering, by the television receiver, presentation of the instance of content based on the identified segment of instance of the content such that less than all of the instance of content is presented.

11. The method for altering presentation of content of claim 10, wherein analyzing the content to identify the segment of the instance of content based on the closed captioning elements and the positional information comprises:
locating, by the television receiver, a phrase within the closed captioning elements, wherein the phrase is indicated in the positional information; and
based on the located phrase within the closed captioning elements, identifying, by the television receiver, the segment of instance of content.

12. The method for altering presentation of content of claim 10, wherein the identified segment of the instance of content corresponds to commercials.

13. The method for altering presentation of content of claim 10, wherein the identified segment of the content corresponds to a content rating different than a content rating of another portion of the instance of content.

14. The method for altering presentation of content of claim 10, further comprising:
storing, by the television receiver, using a non-transitory computer-readable medium, the instance of content based on a stored recording timer.

15. The method for altering presentation of content of claim 10, wherein altering presentation of the instance of content based on the identified segment, comprises:
outputting, by the television receiver, the instance of content for presentation, wherein the presentation is altered based on the identified segment.

16. The method for altering presentation of content of claim 15, wherein altering presentation of the instance of content based on the identified segment comprises:
skipping, by the television receiver, output of a portion of the instance of content based on the identified segment.

17. The method for altering presentation of content of claim 16, wherein the portion of the instance of content is the identified segment.

18. The method for altering presentation of content of claim 10, wherein altering presentation of the content based on the identified segment, comprises:
deleting, by the television receiver, a portion of the instance of content based on the identified segment.

19. A system for altering presentation of content, comprising:
   a content provider system, comprising:
      one or more processors; and
      a non-transitory computer-readable storage media communicatively readable by the one or more processors and having stored therein processor-readable instructions which, when executed by the one or more processors, cause the one or more processors to:
         analyze an instance content and closed captioning elements to create positioning information; and
         cause broadcast of the instance of content, the closed captioning elements, and the positioning information to a plurality of television receivers; and
   a television receiver, comprising:
      a tuner;
      one or more processors; and
      a non-transitory computer-readable storage media communicatively readable by the one or more processors and having stored therein processor-readable instructions which, when executed by the one or more processors, cause the one or more processors to:
         record multiple instances of content via the tuner from the content provider system, wherein
            the television receiver is part of the plurality of television receivers;
            the multiple instances of content include the instance of content; and
            the multiple instances of content are multiplexed and are selected for recording by the content provider;
         receive the closed captioning elements via the tuner;
         receive the positional information indicative of a segment of the instance of content for playback based on the closed captioning elements;
         analyze the instance of content to identify the segment of the instance of content based on the closed captioning elements and the positional information; and
         alter presentation of the instance of content based on the identified segment of the content such that less than all of the instance of content is presented.

20. The television receiver of claim 19, wherein the processor-readable instructions of the television receiver which, when executed by the one or more processors of the television receiver, cause the one or more processors to analyze the instance of content to identify the segment of the instance of content based on the closed captioning elements and the positional information comprises processor-readable instructions which, when executed by the one or more processors, cause the one or more processors to:
   locate a phrase within the closed captioning elements, wherein the phrase is indicated in the positional information; and
   based on the located phrase within the closed captioning elements, identify the segment of the instance of content.

* * * * *